United States Patent
Desai et al.

(10) Patent No.: US 8,631,123 B2
(45) Date of Patent: Jan. 14, 2014

(54) DOMAIN BASED ISOLATION OF NETWORK PORTS

(75) Inventors: Saurabh Desai, Austin, TX (US); George Mathew Koikara, Bangalore (IN); Pruthvi Panyam Nataraj, Bangalore (IN); Guha Prasad Venkataraman, Chennai (IN); Vidya Ranganathan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 152 days.

(21) Appl. No.: 13/006,618

(22) Filed: Jan. 14, 2011

(65) Prior Publication Data

US 2012/0185581 A1 Jul. 19, 2012

(51) Int. Cl.
*G06F 15/173* (2006.01)
*G06F 15/16* (2006.01)

(52) U.S. Cl.
USPC .......................................................... 709/224

(58) Field of Classification Search
USPC ................................. 709/224, 225; 726/1, 26
See application file for complete search history.

(56) References Cited

U.S. PATENT DOCUMENTS

| | | | |
|---|---|---|---|
| 5,666,519 A | 9/1997 | Hayden | |
| 5,845,129 A | 12/1998 | Wendorf et al. | |
| 5,864,683 A * | 1/1999 | Boebert et al. | 709/249 |
| 5,889,952 A | 3/1999 | Hunnicutt et al. | |
| 6,292,494 B1 | 9/2001 | Baker et al. | |
| 6,519,647 B1 | 2/2003 | Howard et al. | |
| 7,017,183 B1 | 3/2006 | Frey et al. | |
| 7,200,869 B1 | 4/2007 | Hacherl et al. | |
| 7,591,015 B2 | 9/2009 | Cargille et al. | |
| 8,107,973 B1 * | 1/2012 | Sjothun | 455/456.3 |
| 2002/0188738 A1 | 12/2002 | Gray | |
| 2003/0009685 A1 | 1/2003 | Choo et al. | |
| 2003/0041154 A1 | 2/2003 | Tran | |
| 2004/0243835 A1 | 12/2004 | Terzis et al. | |
| 2005/0188173 A1 | 8/2005 | Hasbun et al. | |
| 2005/0273851 A1 * | 12/2005 | Raju Datla et al. | 726/14 |
| 2006/0259487 A1 | 11/2006 | Havens et al. | |
| 2007/0011136 A1 | 1/2007 | Haskin et al. | |
| 2007/0039045 A1 | 2/2007 | McKee et al. | |
| 2007/0121632 A1 * | 5/2007 | Zabarski | 370/392 |

(Continued)

FOREIGN PATENT DOCUMENTS

WO  WO2009023586  2/2009

OTHER PUBLICATIONS

"U.S. Appl. No. 13/006,634 Office Action", Mar. 28, 2013, 20 pages.

(Continued)

*Primary Examiner* — Andrew Lai
*Assistant Examiner* — Zhiren Qin
(74) *Attorney, Agent, or Firm* — DeLizio Gilliam, PLLC (57) ABSTRACT

When an operating system process evaluates a rule for an operation being attempted on a logical network port, the operating system process determines whether the target logical port falls within a range of logical ports, and then determines whether the operation is associated with a permitted domain of the range of logical ports. If the operation is a bind operation, then the process attempting to bind to the target port will be allowed to bind if the target port falls within the range and the operation/process is associated with a permitted domain. Otherwise, the binding operation will not be allowed to proceed.

15 Claims, 4 Drawing Sheets

(56) References Cited

U.S. PATENT DOCUMENTS

| | | | |
|---|---|---|---|
| 2007/0214497 | A1 | 9/2007 | Montgomery et al. |
| 2008/0071804 | A1 | 3/2008 | Gunda et al. |
| 2010/0162362 | A1* | 6/2010 | Battle et al. .................. 726/3 |
| 2010/0290475 | A1* | 11/2010 | Belanger et al. ............. 370/401 |
| 2011/0153975 | A1 | 6/2011 | Accapadi et al. |
| 2011/0161644 | A1 | 6/2011 | Nojiri et al. |
| 2012/0185661 | A1 | 7/2012 | Desai et al. |
| 2012/0185930 | A1 | 7/2012 | Desai et al. |

OTHER PUBLICATIONS

Abdullah, Ariff et al., "FreeBSD Handbook", Chapter 13, Section 8, http://www.freebsd.org/doc/en/books/handbook/users-groups.html (Date Obtained from the Internet: Aug. 25, 2010) 2010, 2 pages.

Barkley, John, "Comparing Simple Role Based Access Control Models and Access Control Lists", *Proceeding RBAC '97 Proceedings of the second ACM workshop on Role-based access control* http://delivery.acm.org/10.1145/270000/266769/p127-barkley.pdf?key1=266769&key2=2108522921&coll=DL&dl=ACM&CFID=1856933&CFTOKEN=58395003 (Obtained from the internet on Dec. 13, 2010) Aug. 11, 1997, pp. 127-132.

Freebsd, "13.8 Groups", *FreeBSD Handbook: Chapter 13 Users and Basic Account Management* http://www.freebsd.org/doc/handbook/users-groups.html (Obtained from the internet on Aug. 25, 2010) No Publication Date Found, 2 pages.

Gorman, Mel, "Understanding the Linux Virtual Memory Manager", http://www.phptr.com/perens 2004, 748 pages.

IBM, "Concepts, Planning, and Installation Guide", *General Parallel File System*, Version 3.1 Apr. 2006, 144 pages.

IBM, "Snapshots Reinvented: IBM XIV Storage System", Sep. 2008, 17 pages.

IBM, "Welcome to the AIX 6.1 Information Center", http://publib.boulder.ibm.com/infocenter/aix/v6r1/index.jsp?topic=/com.ibm.aix.doc/doc/base/aixinformation.htm (Date Obtained from the Internet Aug. 3, 2010). 1989, 1 page.

Shepler, S. et al., "NFS version 4 Protocol", *Network Working Group* http://tools.ietf.org/html/rfc3010 (Obtained from the Internet on Aug. 25, 2010) Dec. 2000, 213 pages.

Sun Microsystems, "Lustre File System: High-Performance Storage Architecture and Scalable Cluster File System", *White Paper* http://www.raidinc.com/pdf/whitepapers/lustrefilesystem_wp.pdf Oct. 2008, 20 pages.

Tivoli, "Architectural overview of a clustered environment", *Composite Application Manager for Response Time Tracking*, Version 6.0 http://publib.boulder.ibm.com/infocenter/tivihelp/v3r1/index.jsp?topic=%2Fcom.ibm.itcamrtt.doc_6.0%2FITCAMfTT_InstallConfig10.htm No Publication Date Found, 3 pages.

U.S. Appl. No. 13/006,621, Jan. 14, 2011, Desai, Saurabh.

"U.S. Appl. No. 13/006,626 Office Action", Jan. 31, 2013, 16 pages.

Lindermann, "Different DSM Types", Retrieved from the Internet< http://1129.187.1 08.94/dsmweb/en/understand-dsm/technical-dsm-tutorialO/different-dsmtypes.html> 2009, 6 pages.

* cited by examiner

DOMAIN BASED ISOLATION OF NETWORK PORTS

BACKGROUND

Embodiments of the inventive subject matter generally relate to the field of computers, and, more particularly, to domain based isolation of network ports.

Conventional UNIX or UNIX-like operating systems implement access control mechanism of coarse granularity. On a UNIX system or UNIX-like system, system administration activities are typically performed through the root account. System administrators responsible for the administration of the system share/manage the password to the root account or use access control tools which allow access to the desired services after sufficient authentication.

SUMMARY

Embodiments include a method comprising determining a domain associated with a connection request responsive to receiving at a local machine the connection request from a remote machine. The domain represents an organizational entity and the connection request comprises a logical network port identifier. A set of domain isolation rules in an operating system space of the local machine are accessed. It is determined that the set of domain isolation rules comprises a domain isolation rule that governs a range of logical network port identifiers, and that the range of logical network port identifiers comprise the logical network port identifier. It is determined whether the domain associated with the connection request is a permitted domain for the range of logical network port identifiers according to the domain isolation rule. The connection request is denied if the domain associated with the connection request is not a permitted domain for the range of logical network port identifiers according to the domain isolation rule. The connection request is allowed if the domain associated with the connection request is a permitted domain for the range of logical network port identifiers according to the domain isolation rule.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

The terms "application," "tool," "utility," and "script are used herein to refer to one or more computer programs. The terms "process" and "instance" are used hereinto refer to an executing computer program or executing part of a computer program. To illustrate, an "operating system instance" refers to an instantiated or executing operating system computer program. A "kernel process" refers to a kernel program or kernel service executing in kernel space. "Kernel space" refers to the execution space of the kernel. The description also uses the term "subject" to refer to executing instances of kernel code, application code, a utility, or a tool.

An operating system ("OS") can support access to objects (e.g., devices, file systems, volume groups, files, etc.) for different departments of an organization and for different purposes (e.g., management of the object, writing to the object, viewing the object, invoking an object, etc.). For instance, an OS can support different applications/systems and data for a legal department, a human resources ("HR") department, and a finance department. The OS can support an electronic mail system for all three departments. The OS can also support a docketing application for the legal department and a bookkeeping application for the finance department. The OS may also support a job application database and employee complaint database for the HR department. An organization may want to isolate the objects for the different departments at a granularity greater than currently available. An administrator can create domains for these different departments to isolate the objects of the departments (e.g., database records, department file systems, etc.) for confidentiality reasons, to conform to organizational task divisions (e.g., different information technology departments may support the different departments), etc.

Functionality can be implemented in an operating system to increase the granularity of isolation for objects. A domain can be defined to represent each of different entities (e.g., different departments or work groups). User identifiers and/or user credentials can be associated with the appropriate domain or domains. For instance, an administrator can configure users as members of particular domains. An administrator can then define a set of rules that govern operation(s) that can be performed on the objects based on the domains. The operations can be in response to commands or instructions from an executing application, executing script, process, etc. Processes or subjects running on a system will inherit the domain or domains of a user account logged into the system. A kernel process, for example, can evaluate the set of rules that specify which domains facilitate access to which objects. When a process or subject attempts to perform an operation on an object (e.g., mount a file system or device, create a volume group, view or write to a file, etc.), the kernel process evaluates the domain inherited by the process, and consequently the operation, and the object against the set of rules to determine whether the operation is permitted to proceed.

Figure 1:
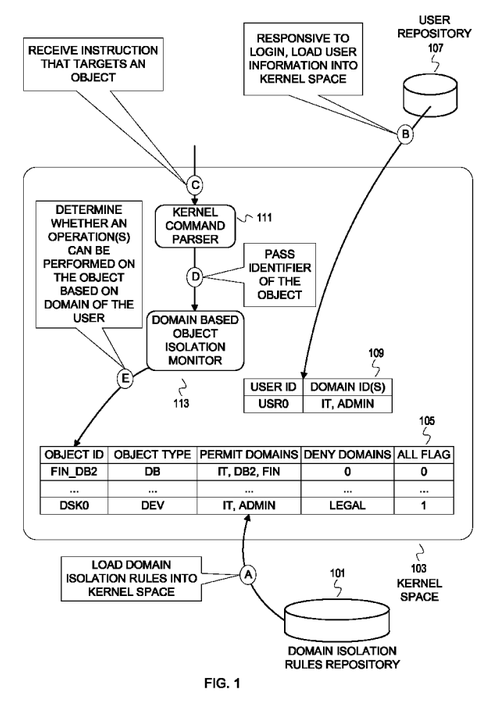
FIG. 1 depicts an example conceptual diagram of domain based object isolation enforced in a kernel space.

FIG. 1 depicts an example conceptual diagram of domain based object isolation enforced in a kernel space. A kernel space 103 comprises a kernel command parser 111 and a domain based object isolation monitor 113. The kernel space 103 represents memory and processes of a kernel on a machine. The kernel command parser 111 represents executing kernel code that parses commands/instructions initiated in user space of the machine hosting the kernel space 103. Although a kernel command parser 111 is not necessarily involved in receiving a command or instruction from user space, FIG. 1 depicts an example involving a command parser to avoid encumbering the description with alternatives.

The machine that hosts the kernel space 103 is communicatively coupled with a user repository 107. The user repository 107 hosts user data (e.g., user credentials, user profiles, etc.) of users that login into the machine. The user data at least includes user identifiers (e.g., usernames, serial numbers, etc.) and associated domains. Each user can be associated with 0 to n domains. When a user is assigned or associated with a domain, the system that manages the user repository 107 updates the corresponding user data to indicate the domain. For instance, a system that supports the creation of domains submits a request to the system that supports the user repository 107 to update a user profile, for example, to indicate a domain. The user repository 107 may be local to the machine that hosts the kernel space 103. The user repository may be distributed throughout a cluster or hosted at a device designated for hosting the user data accessible via a network.

The machine also has access to a domain isolation rules repository 101. The domain isolation rules repository 101 comprises domain isolation rules that indicate which domains are permitted for which objects. A storage device that hosts the domain isolation rules repository 101 can be local or remote with respect to the machine that hosts the kernel space 103.

A root user, super user, or a user with a highest privilege can create domains and domain isolation rules. For instance, a root user can create a domain for IT administrators. The root user can also create a database domain. The root user can define a rule that allows access to manage database objects for users who are assigned to both the IT administrator domain and the database domain. The root user can also define a rule that allows access to manage email objects (e.g., email servers) for users assigned to the IT administrator domain and an "email" domain previously created by the root user.

Defining a domain can comprise establishing an identifier for a domain (e.g., a domain name, a unique numerical identifier, etc.) and a description of the domain. A system that hosts a repository of domains can enforce uniqueness of domain identifiers as unique names and/or generate unique numbers for domains across a node or network. Defining a domain isolation rule comprises indicating an object and a domain(s) that facilitates performance of operation on the object ("permitted domain"). Defining a rule can also comprise specifying a domain that does not facilitate performance of an operation ("denied domain") on the object. For instance, a user may be assigned to an IT domain and a LEGAL domain. A rule may allow a management operation on a particular object if the operation is associated with a user who is a member of the IT domain and an HR domain. A rule may specify that the IT domain is a permitted domain, but the LEGAL domain is a denied domain. Even though the user is a member of the IT domain, an operation associated with the user is not allowed to be performed on an object governed by the rule because the user is also a member of a denied domain. Embodiments can also indicate a flag that represents a constraint of "ANY" or "ALL" domains for an object in a domain isolation rule. If the ALL flag is set in a rule, then an operation associated with a user who is a member of all of the permitted domains indicated in the rule can be performed. Membership in only one of the permitted domains would be insufficient. The ANY or ALL flag can be represented by a single bit or a complex structure. For example, a value of 1 can indicate that ALL domains are required, while a value of 0 can indicate that ANY of the permitted domains is sufficient.

Returning to the example depicted in FIG. 1, a set of domain isolation rules 105 are loaded into the kernel space 103 from the domain isolation rules repository 101 at a stage A. Although embodiments can load all of the domain isolation rules into the kernel space 103, embodiments can also limit loading to a subset of the rules. In addition, the domain isolation rules repository may index or organize rules by various criteria. For example, a set of domain isolation rules can be associated with a particular machine. As another example, domain isolation rules can be loaded after login based on domain membership or credentials of the user that logs into the machine.

At a stage B, user information is loaded into the kernel space 103 from the user repository 107 responsive to a user logging into the machine that hosts the kernel space 103. The user information loaded into the kernel space 103 is instantiated as a user structure instance 109. The user structure instance 109 at least indicates a user identifier and a domain associated with the user represented by the user identifier. In this example, the user identifier is "USR0." The USR0 is a member of the IT domain and the ADMIN domain.

At a stage C, a kernel command parser 111 receives an instruction from user space that targets an object. For example, a user may enter a request to mount a device or increase the size of a filesystem.

At a stage D, the kernel command parser 111 passes an identifier of the object targeted by the instruction to the domain based object isolation monitor 113. For instance, the kernel command parser can call a function that implements the domain based object isolation monitor with the object identifier passed as a parameter. As another example, the kernel command parser 111 can receive a message through a system call which indicates the object identifier to the domain based object isolation monitor 113.

At a stage E, the domain based object isolation monitor 113 determines whether the instruction can be applied to the object (i.e., whether the one or more operations that implement the instruction can be performed on the object) based on the domain(s) of the user associated with the instruction. The domain based object isolation monitor 113 accesses the set of domain isolation rules 105. The set of domain isolation rules 105 indicates an object identifier, an object type, permitted domains, denied or conflict domains, and an ANY or ALL flag. The set of domain isolation rules 105 includes a rule that indicates a database object "FIN_DB2" can be operated upon by an operation(s) associated with any one of the domains IT, DB2, and finance ("FIN"). The set of domain isolation rules 105 also includes a rule that permits access to a device object "DSK0" by an operation(s) associated with a user who is a member of all of the domains IT and ADMIN. Since the USR0 is a member of both the IT domain and the ADMIN domain, a command/instruction that targets the device DSK0 would be allowed to proceed. If the command/instruction targeted the FIN_DB2 object, then the operation(s) that implement the command/instruction would not be permitted to operate upon the FIN_DB2 object.

Although the depicted example refers to a command, embodiments are not so limited. Embodiments can determine whether an operation being performed by an application is permitted to operate upon or access an object. The application would be executing as a process in a user space invoked by a user. The application process inherits the domain of the user. Thus, the corresponding domain identifier of that user would be used to evaluate the set of domain isolation rules against the operation for the object. In addition, embodiments are not limited to specifying particular object identifiers. An administrator can define a rule that governs access to manage types of objects. The administrator could indicate an ANY flag or a wildcard for the object identifier and specify an object type. When the domain based object isolation monitor encounters the wildcard or object identifier ALL flag, then the monitor would evaluate the rule against the type of object that an operation is attempting to operate upon. Further, embodiments are not limited to specifying permitted domains. An embodiment can evaluate a rule that only specifies a denied or conflict domain as allowing all domains not indicated as a denied or conflict domain.

Figure 2:
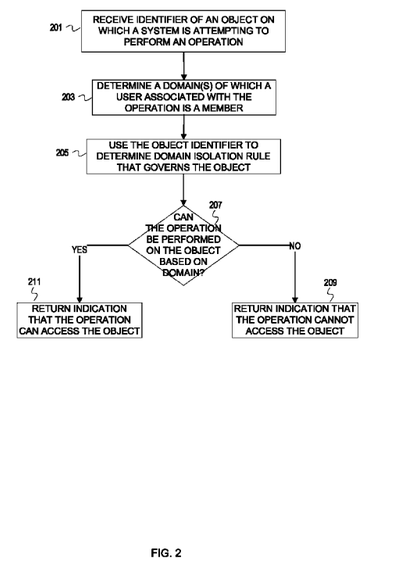
FIG. 2 depicts a flowchart of example operations for evaluating a domain isolation rule for an object.

FIG. 2 depicts a flowchart of example operations for evaluating a domain isolation rule for an object. An object identifier is received that identifies an object on which a system is attempting to perform an operation(s) (201). The object identifier identifies an object that is targeted by a command, an application, an instruction, invoked function, etc. For instance, the user is attempting to modify size of a file system or remove a volume group. As stated earlier, the object identifier may be indicated in a function call, an instruction in an executing script, an operation originating from a utility, an application, etc. The set of one or more operations may be implementing a command instruction that originates from a command line, application instance, operating system process, background process, etc.

A domain(s) to which the user belongs is determined (203). For instance, the user may be a member of a human resources domain. When user data (e.g., credentials, profile, etc.) that represents a user account logged into a system is loaded, the domain identifier(s) indicated in the user data can be stored at a known or reserved location in the operating system space. When evaluating a domain isolation rule, an operating system process can access the known or reserved operating system space location for the domain identifier(s).

The object identifier is used to determine a domain isolation rule that governs the object (205). A set of domain isolation rules can be indexed by object identifiers. For instance, a kernel process locates a domain isolation rule using the object identifier as an index.

It is determined if the operation being attempted can be performed on the object based on domain membership (207). A kernel process evaluates the located domain isolation rule for the object and determines whether the domain of the user is indicated as a permitted domain. The kernel process may also determine whether the rule indicates that a user is required to be a member of all indicated permitted domains, or if the user is a member of a denied or conflict domain. If operation is permitted to be performed on the object, then operations continue at block 211. If operation is not permitted to be performed on the object, then operations continue at block 209.

An indication is returned that the operation is not permitted to be performed on the object if the user is determined to be a member of a denied domain or is not a member of a permitted domain (209). If the user is not a member of a permitted domain, then the operation initiated by or associated with the user cannot be carried out. A denied indication can be returned to the invoking code (e.g., a command parser). A notification can then be displayed that access is not permitted. For example, an error message can be displayed.

If the user credentials indicate a domain membership that satisfies the domain isolation rule for the object, then an indication is returned that the operation can be performed on the object (211). For instance, an allow indication is returned to a command parser, which allows the operation to be carried out.

The depicted flowchart is intended to aid in understanding the inventive subject matter, and should not be used to limit embodiments. Embodiments can perform additional operations, fewer operations, operations in a different order, operations in parallel, etc., than depicted herein. For instance, an indication may not be returned that an operation is not permitted access to an object. The executing code that evaluates the domain isolation rule may invoke an error handler or generate the deny message itself. Further, the domain isolation rules may not be indexed by object identifier. The domain isolation rules can be indexed by object type and then by object identifier. Hence, the rule evaluation code would determine the type of the object and initially access the domain isolation rules with the object type.

Domain based isolation of objects can be used in a system or an operating system that also implements a role based access control environment. Domain based isolation can provide an additional layer of control/security at a different degree of granularity than role based access. The use of domain based object isolation within a role based access control (RBAC) environment provides greater configuration flexibility. To illustrate, a user A may be associated with an administrator role. The administrator role is configured to allow performance of operations to mount devices and/or filesystems. The user A, in this illustration, is a member of a domain FINANCE. A root user configured a set of domain isolation rules to indicate the FINANCE domain as a permitted domain for a device DSK1, and to indicate a domain HR as a permitted domain for a device DSK2. If the user A attempts to mount the device DSK1, the operating system will allow the operation(s) to mount DSK1 to proceed. If the user A attempts to mount the device DSK2, the operating system will enforce the domain isolation rule for DSK2 and not allow the user A to mount DSK2. Hence, an organization can restrict operations, which are performed by a system responsive to commands and/or instructions, based on roles, and isolate objects based on domains. The permutation of domains and roles provides an organization with substantial flexibility to secure and manage resources. Embodiments can implement role based access control with domain based object isolation differently. For instance, role of a user can be evaluated before proceeding to evaluate a corresponding domain isolation rule. Alternatively, a domain isolation rule can be evaluated before evaluating role. In addition, a domain isolation rule can be evaluated in parallel with role of a user.

Furthermore, maintenance type operations are not depicted in the above figures. Embodiments can regulate removal of a domain from a node or machine based on disassociation from the associated object. Embodiments may regulate disassociation of domains from objects or removing of domain identifiers from domain isolation rules to avoid unintended release of an object from domain isolation. For example, a system may prevent a domain isolation rule from being modified to remove a domain A, unless other domains are specified. So, a domain PAYROLL could be disassociated from an object DSK0, as long as the domain PAYROLL is not the sole domain associated with the object DSK0. When attempting to remove an object, an interface can be displayed that indicates all domains associated with the object. The interface can allow an administrator to disassociate each of the domains from the object to allow removal of the object. Embodiments, however, are not constrained to preventing removal of objects until domain disassociation. In addition, domain isolation rules can be automatically updated or manually updated when a domain is removed. For instance, a repository of domains with their descriptions such as domain names and domain ids can be maintained. When an attempt is made to delete a domain, the maintenance code can provide some indication of the objects and/or domain isolation rules associated with the domain. A prompt can be displayed to confirm that the domain should be disassociated from the objects and removed from the domain isolation rules.

The objects that can be isolated with domains include networking objects. Examples of networking objects include logical ports, sockets, and interfaces. When defining or a domain isolation rule, the rule will typically be defined with a name of an object (e.g., the interface "eth0" or the file set "fs1"). Although a wildcard or special value can be used when defining a rule to govern all objects of a particular type, a range of logical network ports can be indicated instead of a wildcard or a single logical port when defining a domain isolation rule for network ports. For instance, a domain isolation rule will indicate logical ports 1280-2200. When an operating system process evaluates the rule for an operation being attempted on a logical port, the operating system process determines whether the target logical port falls within the range, and then determines whether the operation is associated with a permitted domain of the range of logical ports. If the operation is a bind operation, then the processing attempting to bind to the target port will be allowed to bind if the target port falls within the range and the operation/process is associated with a permitted domain. Otherwise, the binding operation will not be allowed to proceed.

Figure 3:
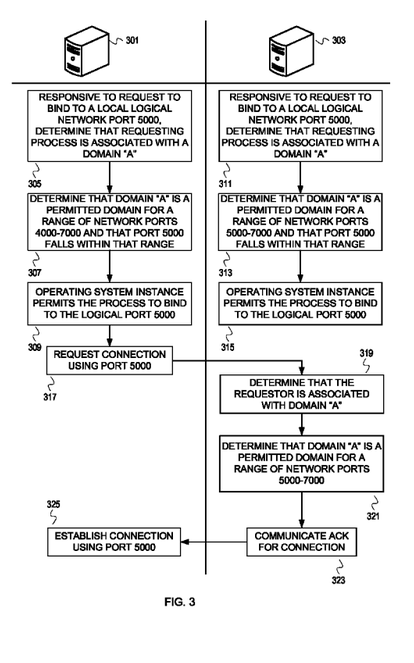
FIG. 3 depicts an example conceptual diagram of domain isolation rules governing binding of ports and establishment of a connection between two machines.

This isolation of logical ports can be used in network security (e.g., prevent spoofing, collect domain data for security forensics, etc.). Domain isolation rules can be defined on machines to regulate connections based on domains. Membership in a denied domain or lack of membership in a permitted domain will prevent a connection from being established. FIG. 3 depicts an example conceptual diagram of domain isolation rules governing binding of ports and establishment of a connection between two machines. In FIG. 3, a machine 301 is communicatively coupled with a machine 303. Each of the machines performs operations to enforce domain isolation rules for local binding of a process to ports. In addition, the machine 303 enforces a domain isolation rule that governs connections with a range of ports. Operation system code that implements network stack functionality can be written to hook into the operating system code that evaluates the domain isolation rules when a connection or session is attempting to be established from a remote machine.

At the machine 301, a process (e.g., a telnet process or a File Transfer Protocol process) attempts to bind to a local logical network port 5000 (305). In response to the attempt by the process, an operating system process determines a domain associated with the process (305). As discussed earlier, the process inherits the domain of a user account logged into the machine 301. In this illustrated example, the process is associated with a domain "A."

The operating system process then accesses the domain isolation rules at the machine 301 based on the port 5000. For instance, the operating system process accesses the domain isolation rules that govern a local port type of object, and compare the corresponding port ranges to the port 5000. The operating system process locates a domain isolation rule that governs a range of local logical network ports 4000-7000 (307). Since this range encompasses the logical port 5000, the operating system process evaluates the domain isolation rule. In this illustrated example, the operating system process determines that the domain "A" is a permitted domain for a port in the range of ports 4000-7000 (307). And the operating system process allows the requesting process to bind to the local logical network port 5000 (309). If the domain "A" is indicated as a denied port, then the operating system process would not allow the requesting process to bind to the port 5000, possibly causing a notification that the domain A is denied. If the operating system process does not locate a domain isolation rule for a range of ports that includes the port 5000, then the operating system process may deny or allow binding depending on default configuration at the machine 301. The machine 301 or domain isolation rules loaded in the machine 301 can be configured to default to either permit or deny when a domain isolation rule is not specified for an object. Embodiments can use various techniques to indicate a range of network port identifiers and to determine whether a network port falls within the indicated range. For example, embodiments can indicate the boundaries of the range. Embodiments can also indicate a beginning logical network port identifier and a number of logical network ports to add to the beginning logical network port identifier in order to determine the range.

The machine 301 then sends a connection request indicating port 5000 to the machine 303 (317). The connection request may indicate a socket derived from the port 5000. At some point prior to the transmission of the connection request, the machine 303 performed similar operations to allow a process at the machine 303 to bind to a port 5000, which is local to the machine 303.

At the machine 303, a process (e.g., a telnet process or a File Transfer Protocol process) attempts to bind to a local logical network port 5000 (311). In response to the attempt by the process, an operating system process of the machine 303 determines a domain associated with the process (311). In this illustrated example, the process is associated with a domain "A."

The operating system process then accesses the domain isolation rules at the machine 303 based on the port 5000 (313). The operating system process locates a domain isolation rule that governs a range of local logical network ports 5000-7000 (313). Since this range encompasses the logical port 5000, the operating system process evaluates the domain isolation rule. In this illustrated example, the operating system process determines that the domain "A" is a permitted domain for a port in the range of ports 5000-7000 (313). And the operating system process allows the requesting process to bind to the local logical network port 5000 (315).

After the machine 303 receives the connection request from the machine 301, the operating system process at the machine 303 determines a domain associated with the connection request (319). In this example, the machine 303 determines that the connection request is associated with domain "A." Embodiment can determine domain associated with a connection request differently. The connection request itself can indicate a domain. When the machine 301 creates the connection request, it can encode the domain of the process into the connection request. Embodiments can also look-up a domain based on network address of the requesting machine. For instance, a database can be maintained that indicates domains of machines on a network. When a user account is logged into a machine, the database can be updated accordingly. When the user account is logged off, the database can remove or mark for removal any entries for that machine. Embodiments can also add a message exchange between machines. The machine can request a domain identifier that corresponds to the connection request.

After determining a domain associated with the connection request, the operating system process at the machine 303 evaluates domain isolation rules at the machine 303 to determine whether the connection should be allowed based on domain (321). In this illustrated example, the operating system process at the machine 303 determines that domain "A" is a permitted domain for the range of network ports 5000-7000 (321). Embodiments can evaluate the same domain isolation rule that is evaluated for local bonding. For this illustration, the operating system process can evaluate the domain isolation rule for the connection request that was evaluated for the local binding request. Embodiments can also provide a separate domain isolation rule for connection requests. For example, a domain isolation rule can be created that specifies an object type of "remote request." A domain isolation rule structure can also indicate an additional field to distinguish between local and remote. For instance, the domain isolation rules at the machine 303 can include a two domain isolation rules that both indicate permitted domains for a range of logical network ports 5000-7000. But each of the rules also indicates a source field. One of the domain isolation rules for the range of ports can indicate "local" in the source field while the second of the domain isolation rules for the port range indicates "remote" in the source field.

Once the operating system process at the machine 303 determines that the connection request is permitted for domain "A," the machine 303 transmits an ACK for the connection to the machine 301 (323). The machine 301 consumes the ACK and establishes the connection using port 5000 (325).

Domain based regulation of connections on ports can supplement existing security mechanisms (e.g., authentication, authorization, etc.). As stated above, spoofing can be prevented since a network address alone is not sufficient to establish a connection. A spoofed address will not indicate a permitted domain. In addition, embodiments can track domains associated with connection requests to help with security forensics if needed. Furthermore, embodiments can implement the domain isolation rules for network port objects and other objects together or separately. For instance, embodiments can maintain separate sets of domain isolation rules for rules that govern ranges of objects and for those that govern individual objects.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
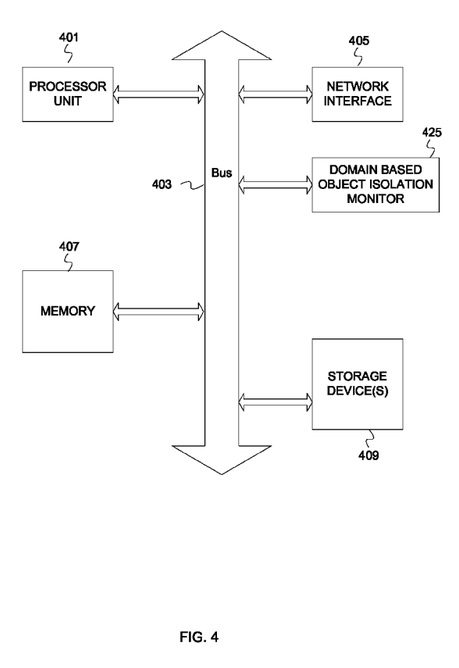
FIG. 4 depicts an example computer system.

FIG. 4 depicts an example computer system. A computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport®, InfiniBand®, NuBus, etc.), a network interface 405 (e.g., an ATM interface, an Ethernet interface, a Frame Relay interface, SONET interface, wireless interface, etc.), and a storage device(s) 409 (e.g., optical storage, magnetic storage, etc.). The example computer system also comprises a domain based object isolation monitor 425 that is coupled with the bus 403. The domain based object isolation monitor determines whether an operation (originating from a command line input, interpreted script, an application process, etc.) can operate upon an object based on domain membership of a user account associated with the operation. The domain based object isolation monitor 425 evaluates a domain isolation rule that governs whether the operation can proceed on the object based on domain membership. The domain based object isolation monitor 425 also regulates connections from remote machines with the domain isolation rules. The domain based object isolation monitor can indicate permit or deny for a connection request that is associated with a denied domain or that is not associated with a permitted domain. Any one of these functionalities may be partially (or entirely) implemented in hardware and/or on the processing unit 401. For example, the functionality may be implemented with an application specific integrated circuit, in logic implemented in the processing unit 401, in a coprocessor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401.

While the embodiments are described with reference to various implementations and exploitations, it will be understood that these embodiments are illustrative and that the scope of the inventive subject matter is not limited to them. In general, techniques for restricting binding of ports or sockets based on domain membership as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining a domain associated with a connection request responsive to receiving at a local machine the connection request from a remote machine, wherein the domain represents an organizational entity and the connection request comprises a logical network port identifier;
   accessing a set of domain isolation rules in an operating system space of the local machine;
   determining that the set of domain isolation rules comprises a domain isolation rule that governs a range of logical network port identifiers that comprise the logical network port identifier;
   determining whether the domain associated with the connection request is a permitted domain for the range of logical network port identifiers according to the domain isolation rule;
   determining if a local process is bound to a local logical network port identified with the logical network port identifier;
   denying the connection request if the domain associated with the connection request is not a permitted domain for the range of logical network port identifiers according to the domain isolation rule;
   allowing the connection request if the domain associated with the connection request is a permitted domain for the range of logical network port identifiers according to the domain isolation rule;
   wherein said allowing the connection is also dependent on determining that the local process is bound to the local logical network port
   determining that the local process is associated with a second domain responsive to the local process attempting to bind to the local logical network port;
   determining that the set of domain isolation rules comprises a second domain isolation rule corresponding to a second range of logical network port identifiers that comprise the logical network port identifier and that the second domain isolation rule indicates that the second domain isolation rule applies to local processes, wherein the domain isolation rule governs remote connection requests and the second domain isolation rule governs local processes;
   determining that the second domain is a permitted domain for the second range of logical network port identifiers; and
   allowing the local process to bind to the logical network port identifier.

2. The method of claim of claim 1 further comprising recording an indication of the domain and the connection request if the connection request is denied for security forensics.

3. The method of claim 1 further comprising:
   determining that the local process is associated with the domain;
   determining that the domain is a permitted domain for a range of local logical network port identifiers that comprise the local logical network port identifier; and
   allowing the local process to bind to the local logical network port.

4. The method of claim 1, wherein said determining that the set of domain isolation rules comprises the domain isolation rule that governs the range of logical network port identifiers that comprise the logical network port identifier comprises:
   determining a subset of the set of domain isolation rules that correspond to network ports, wherein each of the subset of domain isolation rules indicates a corresponding range of logical network port identifiers; and
   at least partially evaluating each of the subset of domain isolation rules to determine if the corresponding range of network port identifiers comprises the logical network port identifier until reaching the domain isolation rule.

5. The method of claim 1, wherein a first data structure comprises the set of domain isolation rules that govern network ports, and a second data structure comprises a second set of domain isolation rules that govern objects that are not network ports.

6. A computer program product for domain based isolation of network ports, the computer program product comprising:
a non-transitory computer readable storage medium having computer usable program code embodied therewith, the computer usable program code executable by a machine to cause the machine to perform operations comprising:
determining a domain associated with a connection request responsive to receiving at a local machine the connection request from a remote machine, wherein the domain represents an organizational entity and the connection request comprises a logical network port identifier;
accessing a set of domain isolation rules in an operating system space of the local machine;
determining that the set of domain isolation rules comprises a domain isolation rule that governs a range of logical network port identifiers that comprise the logical network port identifier;
determining whether the domain associated with the connection request is a permitted domain for the range of logical network port identifiers according to the domain isolation rule;
determining if a local process is bound to a local logical network port identified with the logical network port identifier;
denying the connection request if the domain associated with the connection request is not a permitted domain for the range of logical network port identifiers according to the domain isolation rule;
allowing the connection request if the domain associated with the connection request is a permitted domain for the range of logical network port identifiers according to the domain isolation rule;
wherein said allowing the connection is also dependent on determining that the local process is bound to the local logical network port;
determining that the local process is associated with a second domain responsive to the local process attempting to bind to the local logical network port;
determining that the set of domain isolation rules comprises a second domain isolation rule corresponding to a second range of logical network port identifiers that comprise the logical network port identifier and that the second domain isolation rule indicates that the second domain isolation rule applies to local processes, wherein the domain isolation rule governs remote connection requests and the second domain isolation rule governs local processes;
determining that the second domain is a permitted domain for the second range of logical network port identifiers; and
allowing the local process to bind to the logical network port identifier.

7. The computer program product of claim of claim 6, wherein the operations performed by the machine when executing the computer usable program code further comprise recording an indication of the domain and the connection request if the connection request is denied for security forensics.

8. The computer program product of claim 6, wherein the operations performed by the machine when executing the computer usable program code further comprise:
determining that the local process is associated with the domain;
determining that the domain is a permitted domain for a range of local logical network port identifiers that comprise the local logical network port identifier; and
allowing the local process to bind to the local logical network port.

9. The computer program product of claim 6, wherein said determining that the set of domain isolation rules comprises the domain isolation rule that governs the range of logical network port identifiers that comprise the logical network port identifier comprises:
determining a subset of the set of domain isolation rules that correspond to network ports, wherein each of the subset of domain isolation rules indicates a corresponding range of logical network port identifiers; and
at least partially evaluating each of the subset of domain isolation rules to determine if the corresponding range of network port identifiers comprises the logical network port identifier until reaching the domain isolation rule.

10. The computer program product of claim 6, wherein a first data structure comprises the set of domain isolation rules that govern network ports, and a second data structure comprises a second set of domain isolation rules that govern objects that are not network ports.

11. The computer program product of claim 6, wherein a kernel code comprises the computer usable program code.

12. An apparatus comprising:
a processor;
a network interface operable to transmit and receive connection requests; and
a domain based object isolation monitor operable to
determine a domain associated with a connection request responsive to receiving at a local machine the connection request from a remote machine, wherein the domain represents an organizational entity and the connection request comprises a logical network port identifier;
access a set of domain isolation rules in an operating system space of the local machine;
determine that the set of domain isolation rules comprises a domain isolation rule that governs a range of logical network port identifiers that comprise the logical network port identifier;
determine whether the domain associated with the connection request is a permitted domain for the range of logical network port identifiers according to the domain isolation rule;
determine if a local process is bound to a local logical network port identified with the logical network port identifier;
deny the connection request if the domain associated with the connection request is not a permitted domain for the range of logical network port identifiers according to the domain isolation rule; and
allow the connection request if the domain associated with the connection request is a permitted domain for the range of logical network port identifiers according to the domain isolation rule;
wherein being operable to allow the connection is also dependent on determining that the local process is bound to the local logical network port;

determining that the local process is associated with a second domain responsive to the local process attempting to bind to the local logical network port;

determining that the set of domain isolation rules comprises a second domain isolation rule corresponding to a second range of logical network port identifiers that comprise the logical network port identifier and that the second domain isolation rule indicates that the second domain isolation rule applies to local processes, wherein the domain isolation rule governs remote connection requests and the second domain isolation rule governs local processes;

determining that the second domain is a permitted domain for the second range of logical network port identifiers; and allowing the local process to bind to the logical network port identifier.

13. The apparatus of claim of claim 12, wherein the domain isolation monitor is further operable to record an indication of the domain and the connection request if the connection request is denied for security forensics.

14. The apparatus of claim 12, wherein the domain isolation monitor is further operable to:
  determine that the local process is associated with the domain;
  determine that the domain is a permitted domain for a range of local logical network port identifiers that comprise the local logical network port identifier; and
  allow the local process to bind to the local logical network port.

15. The apparatus of claim 12 further comprising a machine-readable storage medium that embodies the domain based object isolation monitor.

* * * * *